United States Patent
Murase et al.

(10) Patent No.: US 12,358,407 B2
(45) Date of Patent: Jul. 15, 2025

(54) SEATBACK

(71) Applicant: TOYOTA BOSHOKU KABUSHIKI KAISHA, Aichi (JP)

(72) Inventors: Yoshihiro Murase, Aichi (JP); Motohide Oyama, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 214 days.

(21) Appl. No.: 18/139,994

(22) Filed: Apr. 27, 2023

(65) Prior Publication Data

US 2024/0075859 A1 Mar. 7, 2024

(30) Foreign Application Priority Data

Jun. 2, 2022 (JP) ................. 2022-090243

(51) Int. Cl.
*B60N 2/68* (2006.01)
*B60R 22/34* (2006.01)
*B60R 22/46* (2006.01)

(52) U.S. Cl.
CPC .............. *B60N 2/688* (2013.01); *B60R 22/34* (2013.01); *B60R 2022/3402* (2013.01); *B60R 22/4628* (2013.01); *B60R 22/4633* (2013.01)

(58) Field of Classification Search
CPC . B60R 22/34; B60R 22/4634; B60R 22/4628; B60N 2/688
See application file for complete search history.

(56) References Cited

U.S. PATENT DOCUMENTS

| | | | |
|---|---|---|---|
| 9,004,606 B2* | 4/2015 | Bostrom | B60N 2/688 297/464 |
| 9,145,106 B2* | 9/2015 | Muto | B60R 22/34 |
| 9,688,242 B2* | 6/2017 | Nakayama | B60R 22/34 |
| 10,081,280 B2* | 9/2018 | Furukawa | B60N 2/68 |
| 10,144,326 B2* | 12/2018 | Hayashi | B60N 2/688 |
| 10,183,596 B2* | 1/2019 | Watanabe | B60N 2/688 |
| 10,421,377 B2* | 9/2019 | Tobata | B60N 2/90 |
| 2011/0049284 A1* | 3/2011 | Kaneko | B60R 22/4628 242/374 |
| 2023/0278523 A1* | 9/2023 | Ishibashi | B60R 22/24 242/379 |
| 2024/0025315 A1* | 1/2024 | Bruns | B60N 2/10 |

FOREIGN PATENT DOCUMENTS

JP 6450931 B2 1/2019

* cited by examiner

*Primary Examiner* — Syed A Islam
(74) *Attorney, Agent, or Firm* — Greenblum & Bernstein, P.L.C.

(57) ABSTRACT

A seatback with a built-in retractor for a seat belt includes a first bracket configured to receive a tension acting on the retractor via the seat belt, and a second bracket provided on a belt discharge port side of the retractor and configured to hold a posture of the retractor. A portion of the second bracket having the smallest separation distance from the seat belt is constituted with a curved surface.

15 Claims, 6 Drawing Sheets

SEATBACK

CROSS-REFERENCE TO RELATED APPLICATIONS

The present application claims priority based on Japanese Patent Application No. 2022-090243 filed to the Japan Patent Office on Jun. 2, 2022, and the entire content of Japanese Patent Application No. 2022-090243 is incorporated herein by reference.

BACKGROUND

The present disclosure relates to a seatback that has a built-in retractor for a seat belt.

For instance, the invention described in Japanese Patent No. 6450931 is provided with a belt guide case extending from a belt discharge port of a retractor to a proximity of a shoulder.

SUMMARY

The retractor needs to receive a tension acting on the seat belt. Therefore, in general, a first bracket is coupled to the retractor on a side opposite to the belt discharge port, and a second bracket is coupled to the retractor on a belt discharge port side.

The first bracket is a metallic member for receiving the tension mentioned above. The second bracket is a metallic member for holding the posture of the retractor and is formed by press-forming a metal plate into a substantially L shape, for instance.

When a high tension acts on the seat belt, the seat belt (also referred to as a webbing) extending upward from the belt discharge port may possibly come into contact with the second bracket. If the seat belt comes into contact with an edge such as a corner of the second bracket, the seat belt may be possibly damaged.

In view of the above problems, the present disclosure discloses examples of a seatback capable of suppressing a damage to a seat belt even when the seat belt comes into contact with a second bracket.

It is preferable that a seatback with a built-in retractor for a seat belt according to an aspect of the present disclosure comprises at least one of following constituent requirements, for instance.

More specifically, the constituent requirements include: a first bracket configured to receive a tension acting on the retractor via the seat belt; and a second bracket provided on a belt discharge port side of the retractor and configured to hold a posture of the retractor, where a portion of the second bracket having the smallest separation distance from the seat belt is constituted with a curved surface.

Thus, if the seat belt and the second bracket come into contact with each other, a portion of the second bracket in contact with the seat belt is the portion of the second bracket having the smallest separation distance from the seat belt.

In the seatback, since the portion of the second bracket having the smallest separation distance from the seat belt is constituted with the curved surface, a damage to the seat belt can be suppressed as compared with a case where the same portion is a corner formed in the shape of an edge.

It is to be noted that the seatback may have following constituents, for instance.

More specifically, it is preferable that the portion of the second bracket having the smallest separation distance from the seat belt is positioned on an upper end side of the second bracket, and the second bracket comprises: a bracket body having a surface intersecting a seat front-rear direction; and a flange part that extends from an upper end of the bracket body in a direction intersecting the bracket body and that is connected to the bracket body via a curved surface.

Thus, in the seatback, for instance, the bracket body and the flange part can be formed by plastic working such as press working, thereby suppressing a large increase in a manufacturing cost for the second bracket.

Furthermore, it is preferable that the second bracket has a substantially L shape projected on a horizontal plane, and the flange part is provided over a substantially entire region of the upper end of the second bracket. Thus, a damage to the seat belt can be further suppressed.

BRIEF DESCRIPTION OF THE DRAWINGS

Embodiments of the present disclosure will be described hereinafter by way of examples with reference to the accompanying drawings, in which.

DETAILED DESCRIPTION OF THE PREFERRED EMBODIMENTS

Following embodiments are intended to show examples of embodiments that fall within the technical scope of the present disclosure. More specifically, matters and the like described in the claims for specifying the invention are not limited to any specific configuration, structure, or the like described in the following embodiments.

The present embodiments are examples in which a seatback according to the present disclosure is applied to a seatback for a seat mounted on a vehicle such as a wheeled vehicle (hereinafter, referred to as a "vehicular seat"). The seatback is a portion for supporting a back of a sitter.

Arrows for indicating directions, diagonal lines, and the like, shown in the respective drawings, are illustrated to facilitate understanding of mutual relations between the respective drawings, the shapes of members or portions, and the like. Accordingly, the seatback is not limited to the directions illustrated in the respective drawings.

It is to be noted that the directions illustrated in the respective drawings are directions in a condition that the vehicular seat is assembled in the vehicle. A shaded view is not necessarily intended to show a cross-sectional view. At least one member or portion described with a reference sign is provided unless otherwise noted using a term such as "only one".

More specifically, unless otherwise noted using a term such as "only one", two or more of such members may be provided.

First Embodiment

<1. Outline of Seatback>

Figure 1:
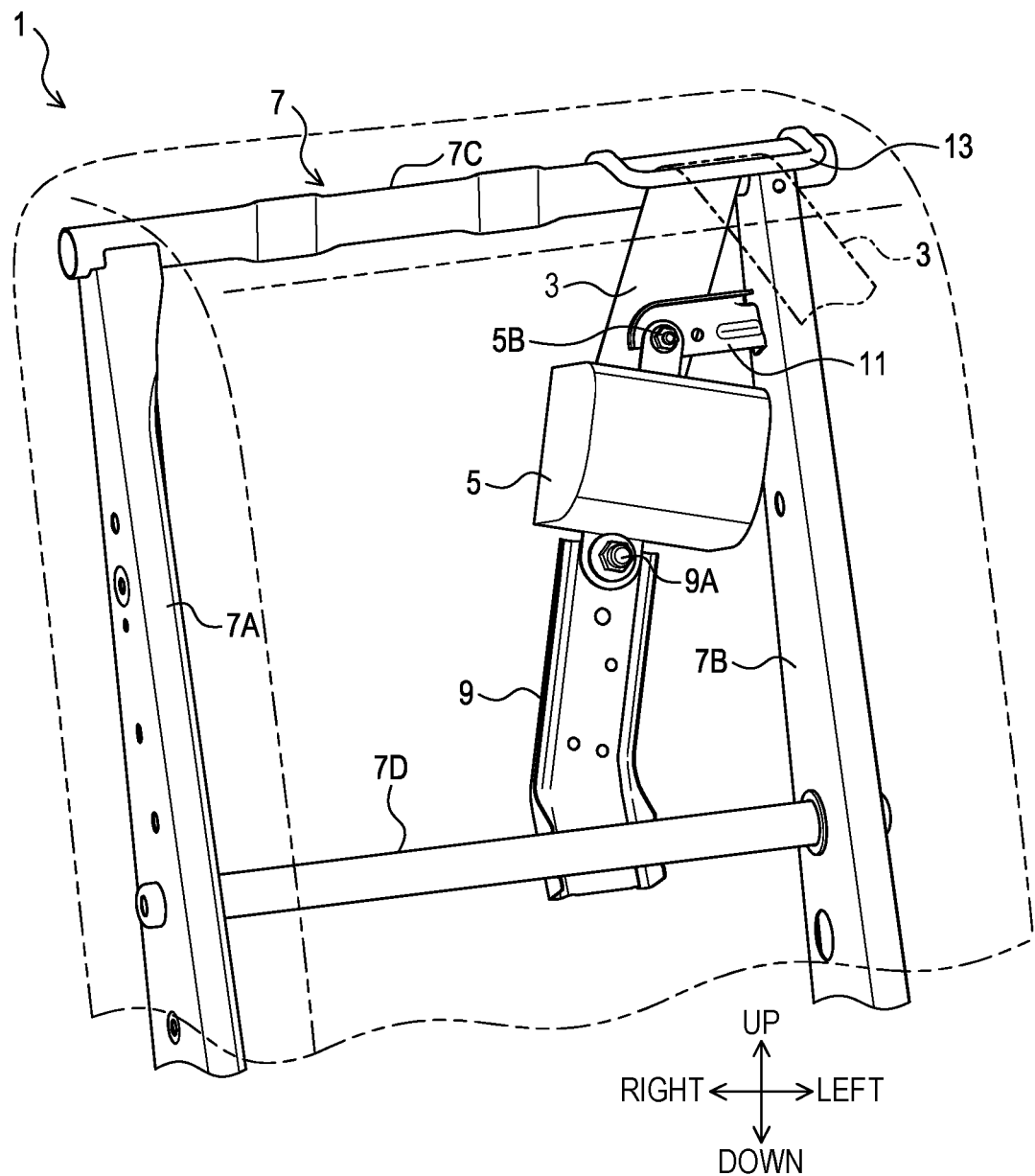
FIG. 1 is a view illustrating a seatback according to a first embodiment.

As illustrated in FIG. 1, a seatback 1 according to the present embodiment is a seatback that has a built-in retractor 5. The seatback 1 may be a seatback of a rear right seat of a five-passenger vehicle, for instance.

The seatback 1 comprises, in addition to the retractor 5, at least a back frame 7, a first bracket 9, a second bracket 11, a belt guide 13, and the like. The back frame 7 is a member constituting a framework of the seatback 1.

The back frame 7 according to the present embodiment comprises two side frames 7A and 7B and two coupling members 7C and 7D, and thus has a rectangular frame shape. The side frame 7A is a metallic member disposed on one end side (the right side in FIG. 1) of the seatback 1 in a seat width direction to extend in an up-down direction.

The side frame 7B is a metallic member disposed on the other end side (the left side in FIG. 1) of the seatback 1 in the seat width direction to extend in the up-down direction. The coupling member 7C is a metallic member extending in the seat width direction to couple respective upper ends of the side frames 7A and 7B.

The coupling member 7D is a metallic member extending in the seat width direction to couple, below the coupling member 7C, the side frames 7A and 7B. The retractor 5 is capable of exerting a function of winding a seat belt 3 and a function of receiving a tension acting on the seat belt 3.

The first bracket 9 is a member for receiving a tension acting on the retractor 5 via the seat belt 3. The first bracket 9 extends from the lower coupling member 7D toward the upper coupling member 7C. One end side of the first bracket 9 in a longitudinal direction thereof is coupled to the back frame 7, and the other end side of the first bracket 9 in the longitudinal direction thereof is coupled to the retractor 5.

Figure 2:
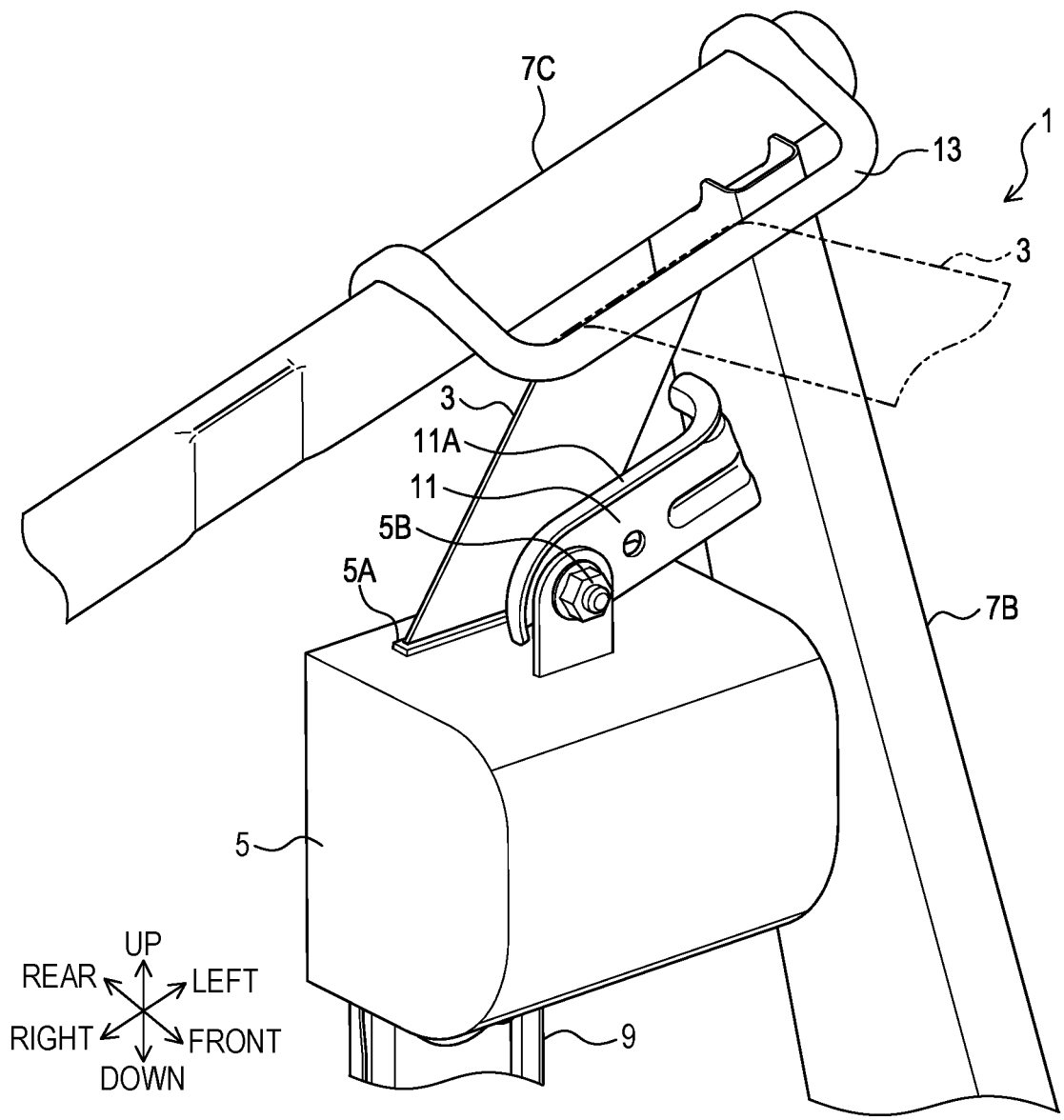
FIG. 2 is a partially enlarged view of the seatback according to the first embodiment.

Specifically, the lower end side of the first bracket 9 is coupled to the lower coupling member 7D. The upper end side of the first bracket 9 is coupled to a side of the retractor 5 opposite to a belt discharge port 5A (see FIG. 2), that is, a lower side of the retractor 5.

According to the present embodiment, the lower end side of the first bracket 9 is coupled to the lower coupling member 71) by welding. The upper end side of the first bracket 9 is coupled to the retractor 5 via a bolt 9A. Thus, a posture of the retractor 5 may possibly change around the bolt 9A.

The second bracket 11 is provided on a belt discharge port 5A side of the retractor 5, that is, on an upper side of the retractor 5 to hold the posture of the retractor 5. "Holding the posture of the retractor 5" means holding an orientation of the belt discharge port 5A in a predetermined orientation, for instance.

The retractor 5 according to the present embodiment is coupled to the first bracket 9 with the single bolt 9A. Therefore, if the second bracket 11 is eliminated, rotational displacement of the retractor 5 around the bolt 9A may possibly occur.

The second bracket 11 extends in the seat width direction, One end side of the second bracket 11 is coupled to the retractor 5 and the other end side of the second bracket 11 is coupled to the back frame 7. Specifically, the one end side of the second bracket 11 is coupled to the retractor 5 with a bolt 5B, and the other end side of the second bracket 11 is welded and fixed to the side frame 7B.

The belt guide 13 receives a tension generated on the seat belt 3 and transmits the tension to the back frame 7. More specifically, in the use of the seat belt 3, the seat belt 3 obliquely extends downward from the belt guide 13 (as indicated by a chain double-dashed line).

Therefore, when a tension is generated on the seat belt 3, at least a load in a seat forward direction and a load in a downward direction act on the belt guide 13. The loads are transmitted to the back frame 7 via the upper coupling member 7C fixed with the belt guide 13.

<2. Details of Second Bracket>

Figure 3:
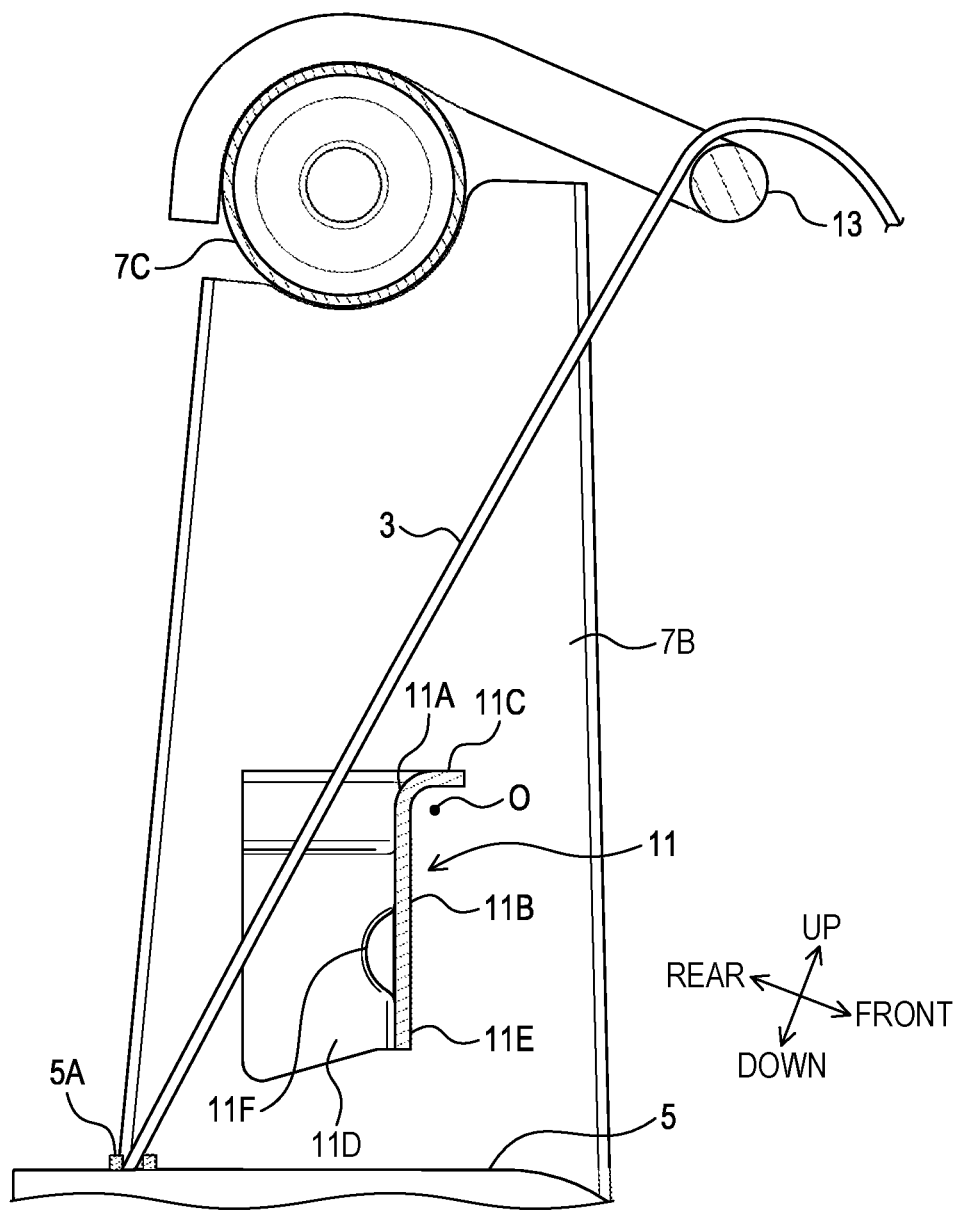
FIG. 3 is a view illustrating a positional relationship between a seat belt and a second bracket.

As illustrated in FIG. 3, a portion of the second bracket 11 having the smallest separation distance from the seat belt 3 (according to the present embodiment, a portion of the second bracket 11 on an upper end side thereof) is provided with a curved surface part 11A.

The curved surface part 11A is a portion constituted with a curved surface protruded toward the seat belt 3. It is to be noted that "constituted with the curved surface protruded toward the seat belt 3" means that "a curvature center O of the curved surface is located on a side opposite to the seat belt 3 with respect to the curved surface".

Figure 4:
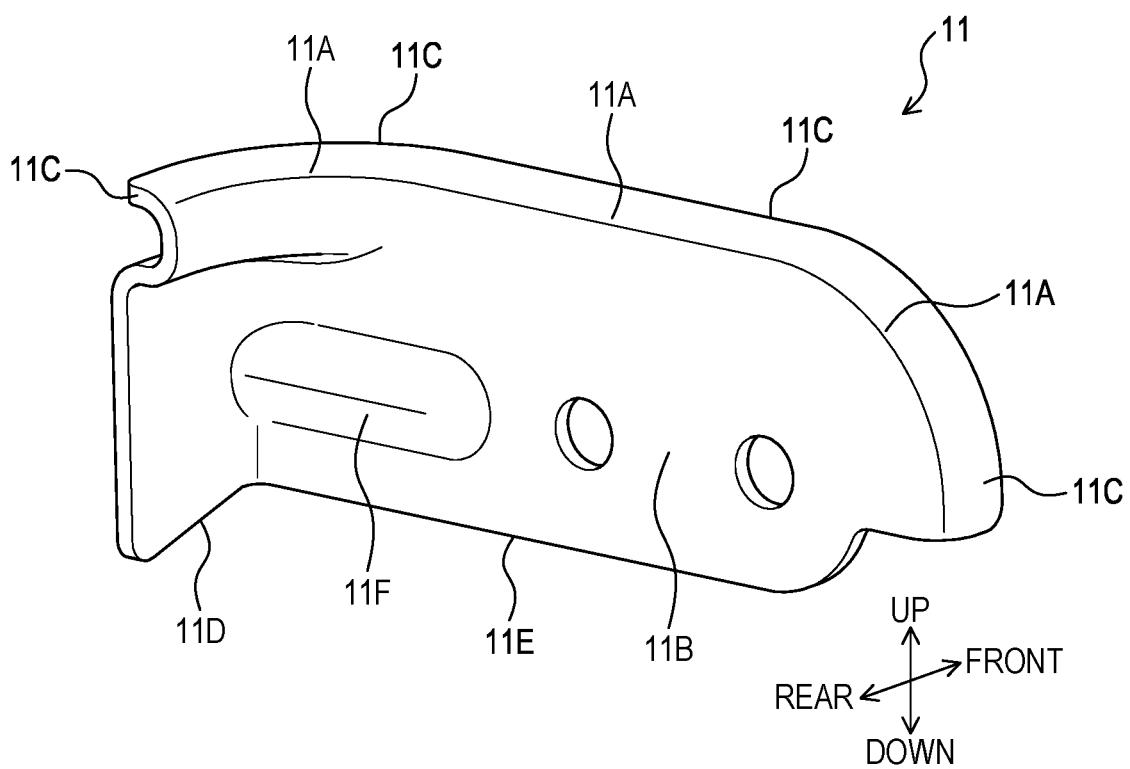
FIG. 4 is a view illustrating a second bracket according to the first embodiment.

Specifically, as illustrated in FIG. 4, the second bracket 11 comprises at least a bracket body 11B, a flange part 11C, and the like. The bracket body 11B is a band plate-shaped portion with a surface intersecting a seat front-rear direction.

The flange part 11C is a portion that extends from an upper end of the bracket body 11B in a direction intersecting the bracket body 11B and that is connected to the bracket body 11B via a curved surface. The curved surface connecting the bracket body 11B and the flange part 11C is the curved surface part 11A.

Figure 5:
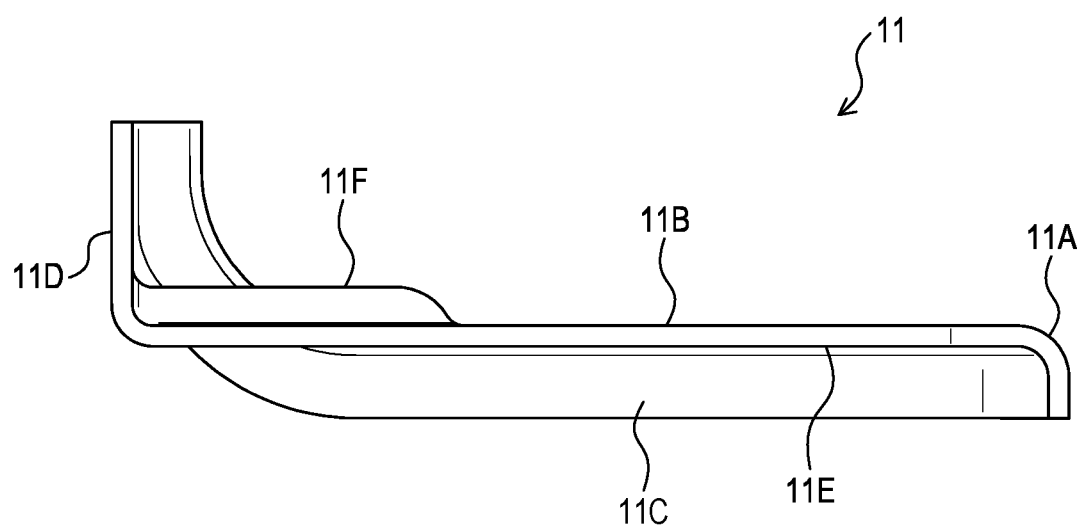
FIG. 5 is a view illustrating the second bracket according to the first embodiment.

The second bracket 11 has a substantially L shape projected on a horizontal plane (see FIG. 5). The flange part 11C and the curved surface part 11A are provided over a substantially entire region of the upper end of the second bracket 11 (see FIG. 4).

It is to be noted that a short part 11D of the substantially L-shaped second bracket 11 is a portion to be welded and fixed to the side frame 7B. A tip end portion of a long part 11E of the substantially L-shaped second bracket 11 is a portion to be coupled with the retractor 5. A bead part 11F is a bulging part for reinforcing a bending strength between the short part 11D and the long part 11E.

<3. Features of Seatback (in Particular, Second Bracket) According to Present Embodiment>

If the seat belt 3 and the second bracket 11 come into contact with each other, the portion of the second bracket 11 in contact with the seat belt 3 is a portion of the second bracket 11 that has the smallest separation distance from the seat belt 3.

Regarding this, according to the present embodiment, the portion of the second bracket 11 that has the smallest separation distance from the seat belt 3 (according to the present embodiment, the portion of the second bracket 11 on the upper end side thereof) is provided with the curved surface part 11A. Accordingly, according to the present embodiment, a damage to the seat belt 3 can be suppressed as compared with a case where the portion having the smallest separation distance from the seat belt 3 is a corner in the form of an edge.

The second bracket 11 comprises the bracket body 11B and the flange part 11C, and has a configuration such that the bracket body 11B and the flange part 11C are connected to each other via the curved surface part 11A.

Thus, according to the present embodiment, for instance, the bracket body 11B and the flange part 11C can be molded by plastic working such as press working, thereby suppressing a large increase in a manufacturing cost for the second bracket 11.

Furthermore, the flange part 11C and the curved surface part 11A are provided over the substantially entire region of the upper end of the second bracket 11. Thus, a damage to the seat belt 3 can be suppressed even if the seat belt 3 comes into contact with any portion on the upper end side of the second bracket 11.

Second Embodiment

Figure 6:
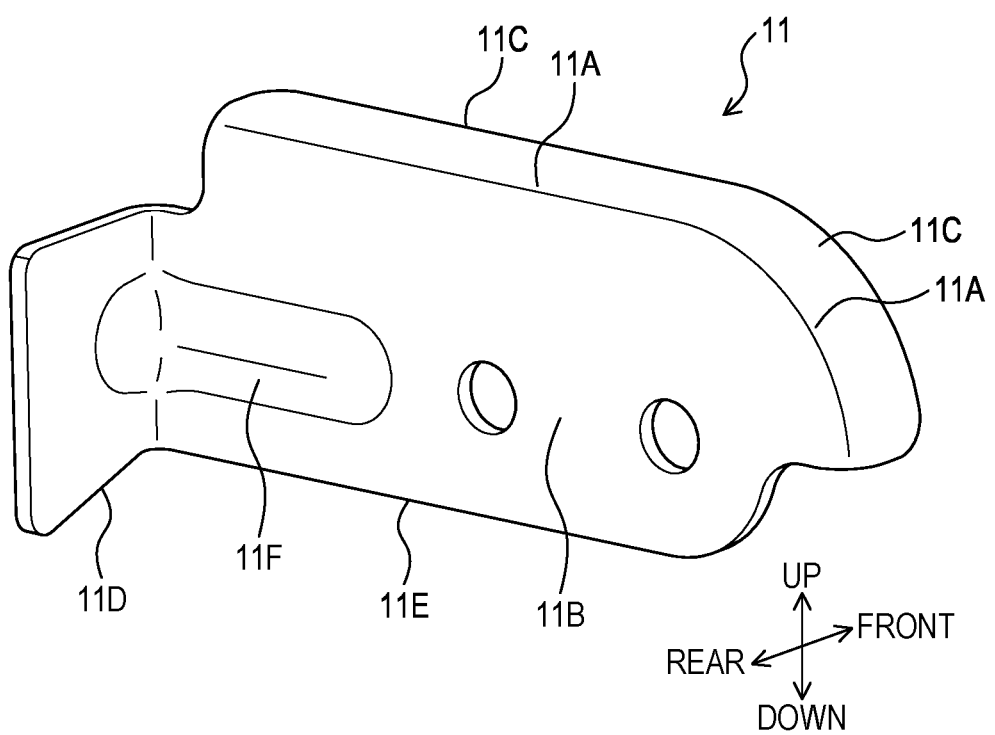
FIG. 6 is a view illustrating a second bracket according to a second embodiment.

The flange part 11C, that is, the curved surface part 11A according to the embodiment described above is provided over the substantially entire region of the upper end of the second bracket 11 (see FIG. 4). In contrast, as illustrated in FIG. 6, only a long part 11E is provided with a flange part 11C, that is, a curved surface part 11A according to the present embodiment.

It is to be noted that the same constituent requirements and the like as those in the embodiment described above are denoted with the same reference numerals as those in the embodiment described above. Therefore, in the present embodiment, repetitive descriptions are omitted.

OTHER EMBODIMENTS

The curved surface part 11A according to the embodiments described above is formed by bending the upper end portion of the second bracket 11. However, the present disclosure is not limited thereto. For instance, the present disclosure may have a structure in which the upper end of the bracket body 11B is covered with a resin cap constituting the curved surface part 11A.

In the second bracket 11 according to the embodiments described above, a band plate member is subjected to press working to bend the upper end portion of the second bracket 11 and to form the curved surface part 11A. However, the present disclosure is not limited thereto.

For instance, according to the present disclosure, the second bracket 11 may be made from a round pipe, a square pipe with rounded corners, or a half pipe member that provides a substantially C-shaped cross section of the bracket body 11B. These configurations provide "a structure in which at least a portion of the second bracket 11 having the smallest separation distance from the seat belt 3 is constituted with a curved surface".

The second bracket 11 according to the embodiments described above is made of a metal. However, the present disclosure is not limited thereto. For instance, the present disclosure may encompass "a second bracket made of a resin in which at least a portion having the smallest separation distance from the seat belt 3 is constituted with a curved surface".

In the second bracket 11 according to the embodiments described above, the short part 11D is located on the seat rear side with respect to the long part 11E. However, the present disclosure is not limited thereto. The present disclosure may be configured such that the short part 11D is fixed to the back frame 7 such that the short part 11D is located on the seat front side with respect to the long part 11E, for instance.

Furthermore, the present disclosure is not limited to the embodiments described above. For instance, the present disclosure encompasses a configuration obtained by combining at least two of the multiple embodiments described above, or a configuration obtained by eliminating any of the constituent requirements illustrated in the drawings or the constituent requirements described with the reference numerals in the embodiments described above.

What is claimed is:

1. A seatback with a built-in retractor for a seat belt, the seatback comprising:
   a first bracket configured to receive a tension acting on the retractor via the seat belt; and
   a second bracket provided on a belt discharge port side of the retractor and configured to hold a posture of the retractor, wherein
   a portion of the second bracket having a smallest separation distance from the seat belt is constituted with a curved surface, and
   the curved surface is further provided in a region of the second bracket where the seat belt does not overlap the second bracket.

2. The seatback according to claim 1, wherein the curved surface is a curved surface protruded toward the seat belt.

3. The seatback according to claim 1, wherein
   the portion of the second bracket having the smallest separation distance from the seat belt is positioned on an upper end side of the second bracket, and
   the second bracket comprises:
   a bracket body having a surface intersecting a seat front-rear direction; and
   a flange part that extends from an upper end of the bracket body in a direction intersecting the bracket body and that is connected to the bracket body via a curved surface.

4. The seatback according to claim 3, wherein
   the second bracket has a substantially L shape projected on a horizontal plane, and
   the flange part is provided over a substantially entire region of the upper end of the second bracket.

5. The seatback according to claim 2, wherein
   the portion of the second bracket having the smallest separation distance from the seat belt is positioned on an upper end side of the second bracket, and
   the second bracket comprises:
   a bracket body having a surface intersecting a seat front-rear direction; and
   a flange part that extends from an upper end of the bracket body in a direction intersecting the bracket body and that is connected to the bracket body via a curved surface.

6. The seatback according to claim 5, wherein
   the second bracket has a substantially L shape projected on a horizontal plane, and
   the flange part is provided over a substantially entire region of the upper end of the second bracket.

7. A seatback with a built-in retractor for a seat belt, the seatback comprising:
   a first bracket configured to receive a tension acting on the retractor via the seat belt; and
   a second bracket provided on a belt discharge port side of the retractor and configured to hold a posture of the retractor, wherein
   a portion of the second bracket having a smallest separation distance from the seat belt is constituted with a curved surface,
   the second bracket is fixed to a side frame of the seatback, and
   the curved surface is provided in an entire region of the second bracket.

8. The seatback according to claim 7, wherein the curved surface is a curved surface protruded toward the seat belt.

9. The seatback according to claim 7, wherein
the portion of the second bracket having the smallest separation distance from the seat belt is positioned on an upper end side of the second bracket, and
the second bracket comprises:
- a bracket body having a surface intersecting a seat front-rear direction; and
- a flange part that extends from an upper end of the bracket body in a direction intersecting the bracket body and that is connected to the bracket body via a curved surface.

10. The seatback according to claim 9, wherein
the second bracket has a substantially L shape projected on a horizontal plane, and
the flange part is provided over a substantially entire region of the upper end of the second bracket.

11. The seatback according to claim 8, wherein
the portion of the second bracket having the smallest separation distance from the seat belt is positioned on an upper end side of the second bracket, and
the second bracket comprises:
- a bracket body having a surface intersecting a seat front-rear direction; and
- a flange part that extends from an upper end of the bracket body in a direction intersecting the bracket body and that is connected to the bracket body via a curved surface.

12. The seatback according to claim 11, wherein
the second bracket has a substantially L shape projected on a horizontal plane, and
the flange part is provided over a substantially entire region of the upper end of the second bracket.

13. A seatback with a built-in retractor for a seat belt, the seatback comprising:
- a first bracket configured to receive a tension acting on the retractor via the seat belt; and
- a second bracket provided on a belt discharge port side of the retractor and configured to hold a posture of the retractor, wherein
a portion of the second bracket having a smallest separation distance from the seat belt is constituted with a curved surface,
the portion of the second bracket having the smallest separation distance from the seat belt is positioned on an upper end side of the second bracket, and
the second bracket comprises:
- a bracket body having a surface intersecting a seat front-rear direction; and
- a flange part that extends from an upper end of the bracket body in a direction intersecting the bracket body and that is connected to the bracket body via a curved surface.

14. The seatback according to claim 13, wherein the curved surface is a curved surface protruded toward the seat belt.

15. The seatback according to claim 13, wherein
the second bracket has a substantially L shape projected on a horizontal plane, and
the flange part is provided over a substantially entire region of the upper end of the second bracket.

* * * * *